United States Patent
Matsumoto et al.

(10) Patent No.: US 6,564,419 B2
(45) Date of Patent: May 20, 2003

(54) WIPER APPARATUS HAVING FOUR-BAR LINKAGE MECHANISM

(75) Inventors: Hiroshi Matsumoto, Hamamatsu (JP); Takashi Umeno, Kosai (JP); Tomohide Kawaguchi, Toyohashi (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/987,348

(22) Filed: Nov. 14, 2001

(65) Prior Publication Data
US 2002/0100137 A1 Aug. 1, 2002

(30) Foreign Application Priority Data
Jan. 29, 2001 (JP) ........................................ 2001-020835

(51) Int. Cl.7 ................................ B60S 1/24; B60S 1/06
(52) U.S. Cl. ........................ 15/250.21; 74/51; 74/43; 15/250.3
(58) Field of Search ........................... 15/250.21, 250.23, 15/250.3, 250.31, 250.13; 74/42, 43, 51

(56) References Cited

U.S. PATENT DOCUMENTS 5,920,948 A * 7/1999 Hayashi et al. ............ 15/250.21
6,314,607 B1 11/2001 Kinoshita ................. 15/250.21

FOREIGN PATENT DOCUMENTS

JP 11-240423 9/1999

* cited by examiner

Primary Examiner—Gary K. Graham
(74) Attorney, Agent, or Firm—Posz & Bethards, PLC

(57) ABSTRACT

A first lever is rotatably supported by a first support shaft connected to a vehicle body. The first lever has a first connection spaced away from the first support shaft. The first lever is reciprocally swung about the first support shaft by a driving force transmitted from a motor. A second lever is rotatably supported by a second support shaft connected to the vehicle body. The second lever has a second connection. A third lever is rotatably connected to both the first connection and the second connection. The third lever has an arm support shaft arranged at an offset position offset from a line connecting between the first connection and the second connection. A wiper arm is secured to the arm support shaft. A wiper blade is connected to a distal end of the wiper arm.

16 Claims, 6 Drawing Sheets

WIPER APPARATUS HAVING FOUR-BAR LINKAGE MECHANISM

CROSS REFERENCE TO RELATED APPLICATION

This application is based on and incorporates herein by reference Japanese Patent Application No. 2001-20835 filed on Jan. 29, 2001.

BACKGROUND OF THE INVENTION

1. Field of the Invention

The present invention relates to a wiper apparatus for wiping a windshield or the like of a vehicle.

2. Description of Related Art

Besides a conventional wiper apparatus having a wiper arm that swings about a single stationary axis to wipe a windshield or the like of a vehicle with a wiper blade attached to a distal end of the wiper arm, there has been proposed a wiper apparatus that uses a four-bar linkage mechanism to provide a wider wiping range on the windshield, as shown in FIG. 8. Such a wiper apparatus includes first to third levers 51–53. A base end portion of the first lever 51 is secured to an upper end portion of a first support shaft 54 that is rotatably supported by a vehicle body (not shown). A base end portion of the second lever 52 is secured to an upper end portion of a second support shaft 55 that is rotatably supported by the vehicle body (not shown). The third lever 53 constitutes an arm head of a wiper arm. A base end portion of the third lever 53 is rotatably connected to a first connection 51a arranged at a distal end portion of the first lever 51. A middle portion of the third lever 53 is rotatably connected to a second connection 52a that is arranged at a distal end portion of the second lever 52 and is spaced away from the first connection 51a by a predetermined distance.

The wiper blade (not shown) for wiping the windshield is connected to a distal end portion of the third lever 53 through a retainer (not shown) of the wiper arm.

A swing lever 56 is connected to a lower end portion of the first support shaft 54. The swing lever 56 reciprocally swings within a predetermined angular range when it is driven by a driving force of a motor 60 transmitted through a rod 57.

In this wiper apparatus having the four-bar linkage mechanism, when the first lever 51 swings together with the swing lever 56 due to the driving force of the motor 60, the second and third levers 52, 53 also swing while keeping the predetermined space between the first connection 51a and the second connection 52a. During this operation, the base end portion (the first connection 51a) of the third lever 53 reciprocally swings about the first support shaft 54 along an arcuate path. Also, the entire third lever 53 swings about the first connection 51a in a direction different from a direction of the reciprocal movement of the base end portion of the third lever 53. With reference to FIG. 8, while the wiper apparatus is stopped or rested, a distance between the first support shaft 54 and the second connection 52a becomes a length "C". On the other hand, during the wiping operation of the wiper apparatus, the distance between the first support shaft 54 and the second connection 52a becomes equal to a sum of a length "a" and a length "b" (here, the length "a" is the length between the first connection 51a and the second connection 52a, and the length "b" is the length between the first support shaft 54 and the first connection 51a). As a result, the wiping range of the wiper blade of the above wiper apparatus is increased in comparison to the conventional wiper apparatus that has the wiper arm that swings about the single stationary axis.

The above-described wiper apparatus having the four-bar linkage mechanism is generally arranged at a lower end side of the windshield. More specifically, a cowl louver is arranged at the lower end side of the windshield, and middle portions of the first and second support shafts 54, 55 are received in through holes 58, 59 (each depicted with a dot-dot-dash line in FIG. 8) of the cowl louver, respectively. That is, the swing lever 56, the rod 57 and the motor 60 are arranged below the cowl louver.

On the other hand, the first to third levers 51–53 (four-bar linkage mechanism) are disposed above (outside) of the cowl louver, so that a cover for protecting the first to third levers 51–53 (four-bar linkage mechanism) from snow, twigs or other obstacles needs to be provided. This will generally result in an increase in the number of the components and hence an increase in a manufacturing cost of the wiper apparatus. Furthermore, since the first to third levers 51–53 are disposed outside of the cowl louver, an appearance of the vehicle having them is disadvantageously deteriorated.

To address this disadvantage, in place of the above wiper apparatus that uses the third lever 53 as the arm head of the wiper arm, it is conceivable to provide a wiper apparatus that has an arm support shaft projected upwardly from the base end of the third lever 53 (the first connection 51a). In this wiper apparatus, an arm head of a wiper arm is secured to the arm support shaft, and the components located below the arm support shaft are placed below the cowl louver. In this way, the four-bar linkage mechanism is not disposed above (outside) the cowl louver, so that there is no need to provide the cover or the like to protect the four-bar linkage mechanism. However, in this case, the arm support shaft supported at the first connection 51a reciprocally moves along a simple arcuate path about the first support shaft 54, and this simple arcuate path has a relatively large extent in a fore-aft direction of the vehicle. Thus, a corresponding simple arcuate through hole, which corresponds to the simple arcuate path of the arm support shaft, needs to be formed in the cowl louver in order to receive the arm support shaft and also in order to allow the movement of the arm support shaft therethrough. Such an arcuate through hole, which has the relatively large extent in the fore-aft direction of the vehicle, imposes various limitations in designing the structure for achieving the predetermined wiping range, a size of the four-bar linkage mechanism, and an accommodating space for accommodating the four-bar linkage mechanism. Thus, layout of the vehicle components is undesirably limited. Particularly, when it is desired to position the first support shaft 54 adjacent to the windshield, the arcuate through hole needs to be extended to the windshield. Because of this, it is not possible to position the first support shaft 54 adjacent to the windshield.

SUMMARY OF THE INVENTION

The present invention addresses the above disadvantages. Thus, it is an objective of the present invention to provide a wiper apparatus of a vehicle capable of achieving a wide wiping range, an improved vehicle appearance, easy component layout and elimination of a dedicated cover for protecting components of the wiper apparatus from snow, twigs or any other undesirable obstacles.

To achieve the objective of the present invention, there is provided a wiper apparatus for wiping a wiping surface of a vehicle. The wiper apparatus includes a drive source, a first swing element, a second swing element, a connecting swing element, a wiper arm and a wiper blade. The first swing element is rotatably supported by a first support element that is connected to a vehicle body of the vehicle. The first swing element has a first connection spaced away from the first support element. The first swing element is reciprocally swung about the first support element by a driving force transmitted from the drive source. The second swing element is rotatably supported by a second support element that is connected to the vehicle body and is spaced away from the first support element. The second swing element has a second connection spaced away from the second support element. The connecting swing element is rotatably connected to the first connection of the first swing element and is also rotatably connected to the second connection of the second swing element in such a manner that the first connection is spaced away from the second connection. The connecting swing element has an arm support shaft that is arranged at an offset position offset from a line connecting between the first connection and the second connection. The wiper arm is secured to the arm support shaft of the connecting swing element to integrally move therewith. The wiper blade is connected to a distal end of the wiper arm to wipe the wiping surface of the vehicle.

To achieve the objective of the present invention, there may be alternatively provided a wiper apparatus for wiping a wiping surface of a vehicle. The wiper apparatus includes a drive source, a first swing element, a second swing element, a connecting swing element, a first wiper arm, a first wiper blade, a second wiper arm and a second wiper blade. The first swing element is rotatably supported by a first support element that is connected to a vehicle body of the vehicle. The first swing element has a first connection spaced away from the first support element. The first swing element is reciprocally swung about the first support element by a driving force transmitted from the drive source. The second swing element is rotatably supported by a second support element that is connected to the vehicle body and is spaced away from the first support element. The second swing element has a second connection spaced away from the second support element. The connecting swing element is rotatably connected to the first connection of the first swing element and is also rotatably connected to the second connection of the second swing element in such a manner that the first connection is spaced away from the second connection. The connecting swing element has an arm support shaft that is arranged at an offset position offset in a direction away from the wiping surface of the vehicle from a line connecting between the first connection and the second connection. The first wiper arm is secured to the arm support shaft of the connecting swing element to integrally move therewith. The first wiper blade is connected to a distal end of the first wiper arm to wipe the wiping surface of the vehicle. The second wiper arm is rotatably supported at a stationary support point that is spaced away from both the first support element and the second support element. The second wiper arm swings about the stationary support point synchronously with the first wiper arm. The second wiper blade is connected to a distal end of the second wiper arm to wipe the wiping surface of the vehicle. A portion of the second wiper blade is aligned with the arm support shaft in a fore-aft direction of the vehicle between the arm support shaft and the wiping surface while the second wiper blade is positioned at its rest position.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
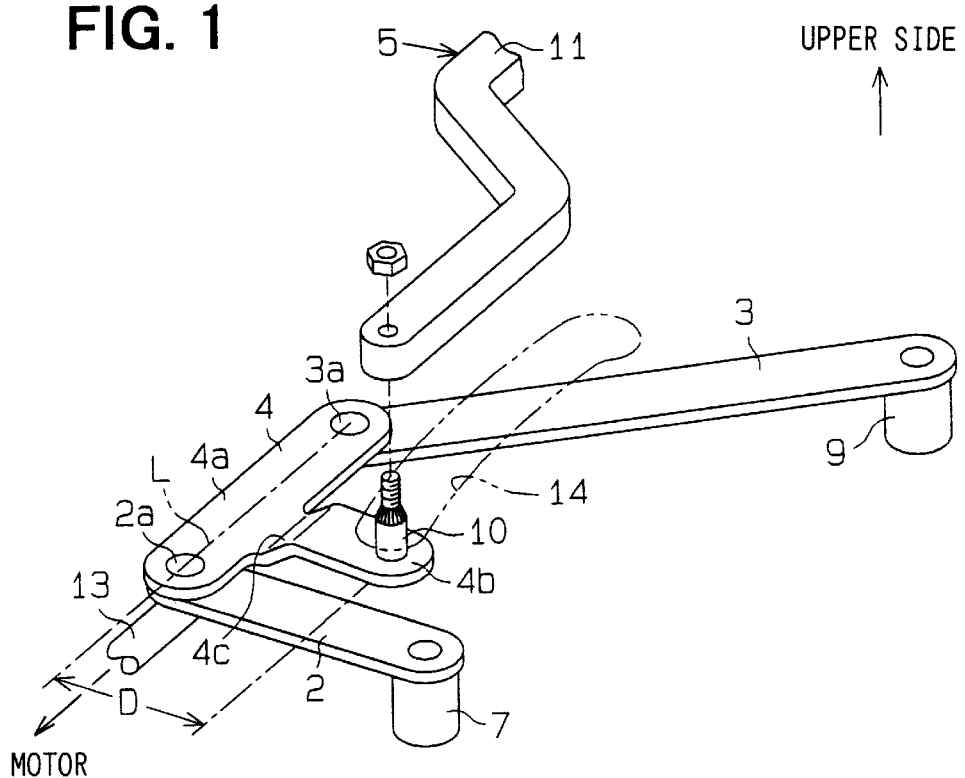
FIG. 1 is a partially exploded perspective view showing a four-bar linkage mechanism of a wiper apparatus of a vehicle according to an embodiment of the present invention.
Figure 2:
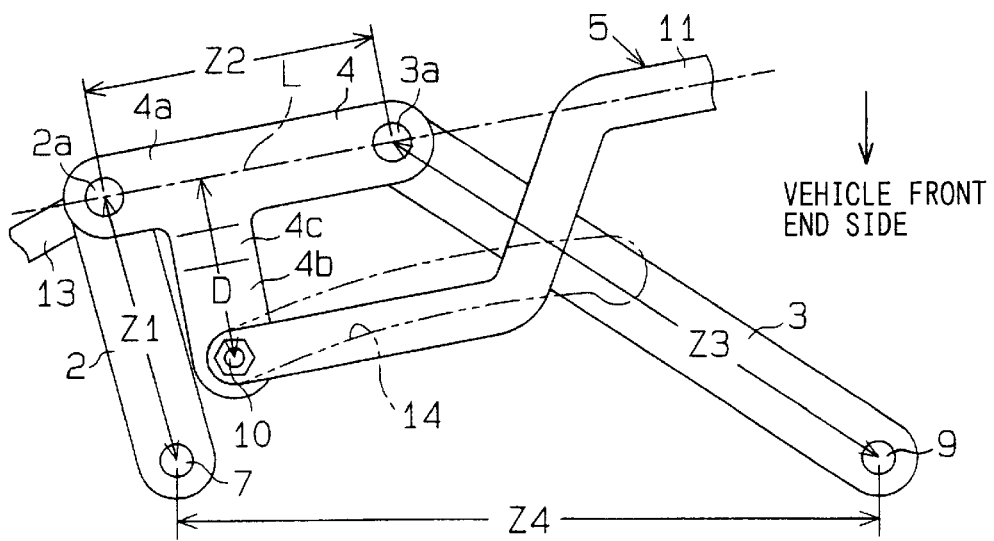
FIG. 2 is a plan view of the four-bar linkage mechanism shown in FIG. 1.
Figure 3:
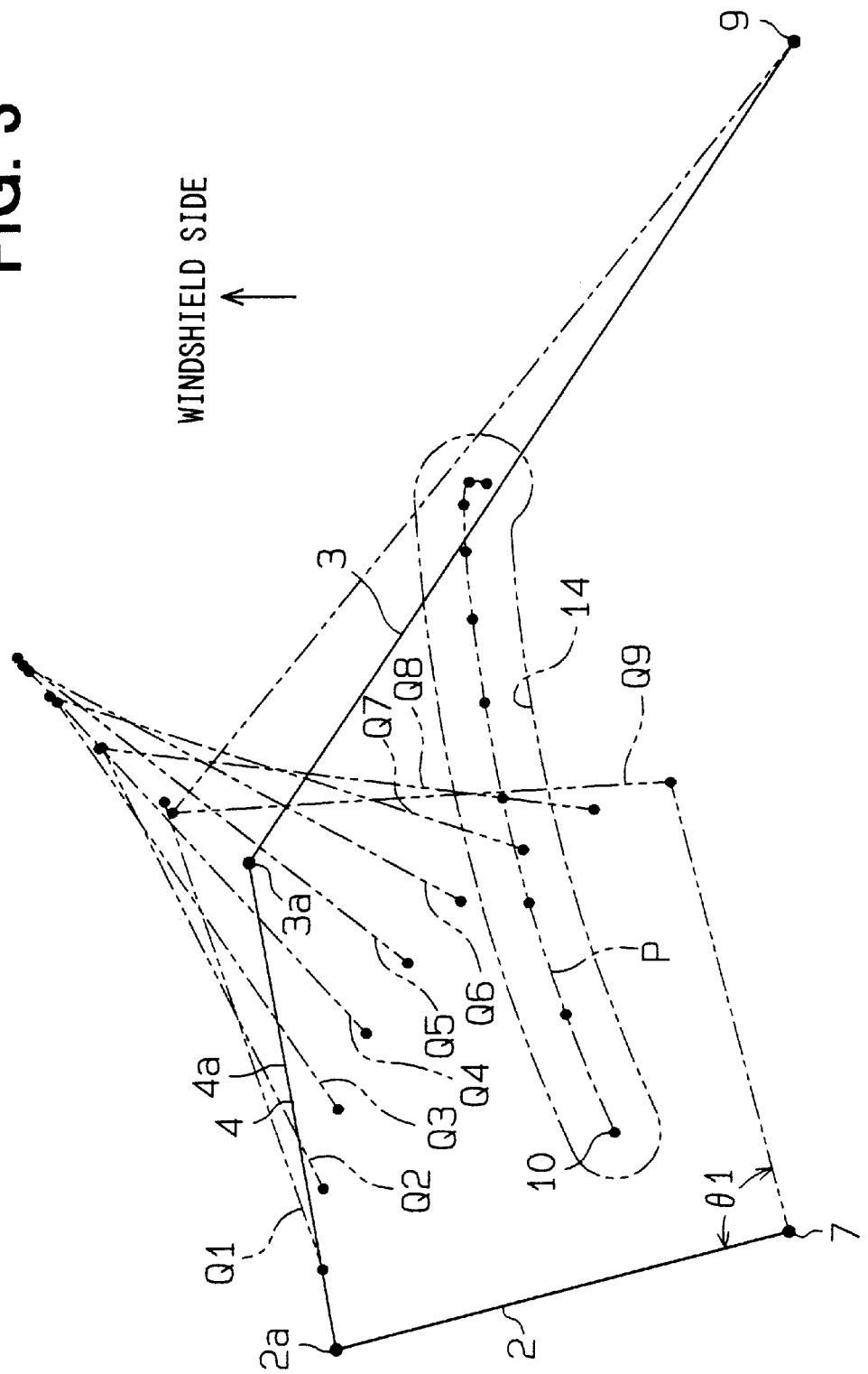
FIG. 3 is a schematic view showing operation of the wiper apparatus according to the embodiment.
Figure 4:
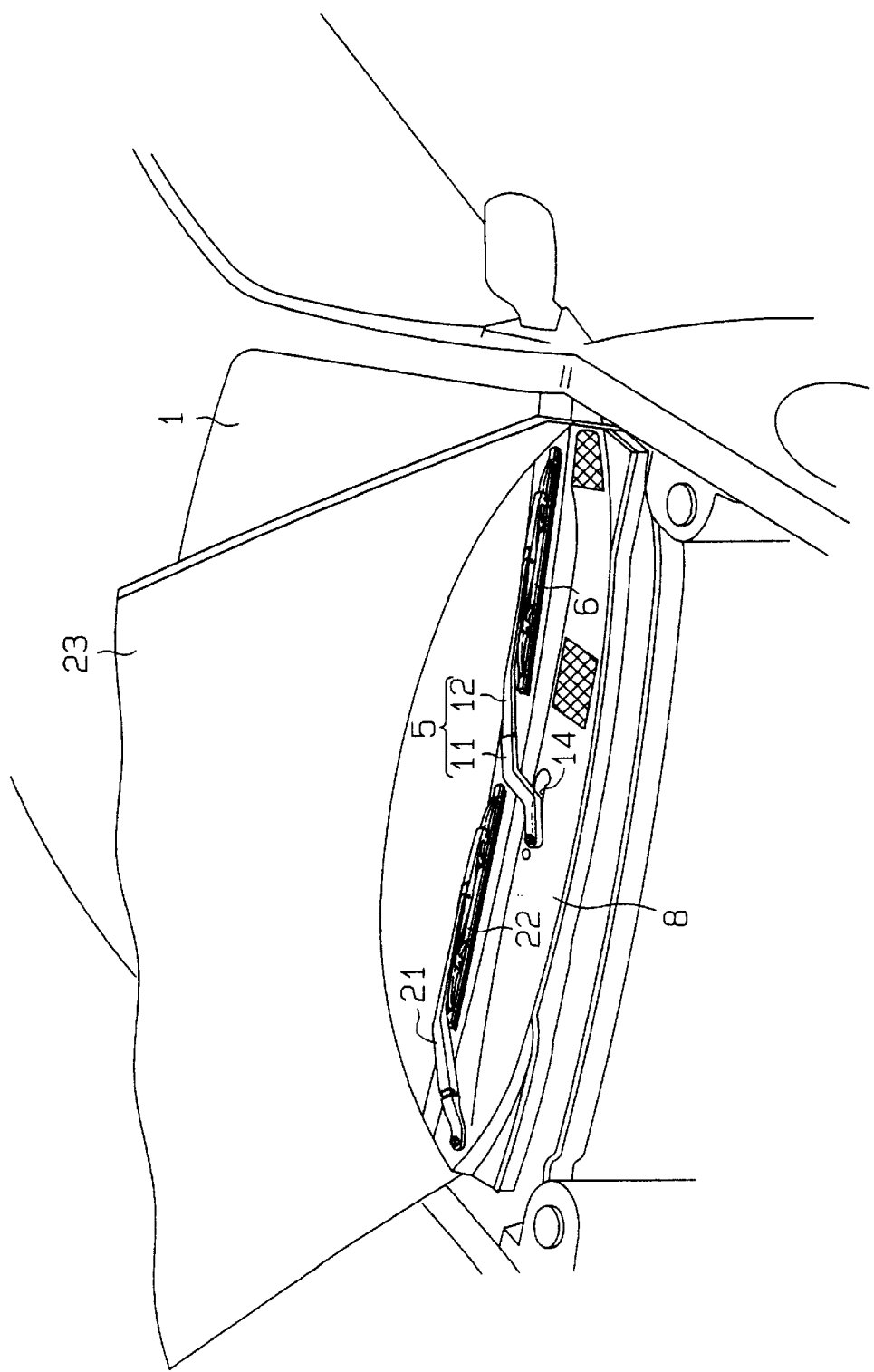
FIG. 4 is a partial perspective view showing various components of the wiper apparatus disposed outside of the vehicle.

One embodiment of the present invention will be first described with reference to FIGS. 1 to 5. As shown in FIG. 4, a wiper apparatus according to the present embodiment is placed at a lower end side of a windshield (wiping surface of the present invention) 1. More particularly, the wiper apparatus is arranged generally at the center of the lower end side of the windshield 1. With reference to FIGS. 1, 2 and 4, the wiper apparatus includes a first lever (acting as a first swing element) 2, a second lever (acting as a second swing element) 3, a third lever (acting as a connecting swing element) 4, a first wiper arm 5 and a first wiper blade 6.

The first lever 2 extends linearly and is shaped into a plate form. A base end portion of the first lever 2 is securely connected to an upper end portion of a first support shaft 7 that is rotatably supported by a vehicle body. The first support shaft 7 extends upwardly from the vehicle body below (inside) a resin cowl louver 8 (FIG. 4) that is secured to a lower end side of the windshield 1.

The second lever 3 extends linearly and is shaped into a plate form. A base end portion of the second lever 3 is securely connected to an upper end portion of a second support shaft 9 that is rotatably supported by the vehicle body. Below the cowl louver 8 (FIG. 4), the second support shaft 9 extends upwardly and is spaced away from the first support shaft 7 in a width direction of the vehicle on the right side of the first support shaft 7.

The third lever 4 includes a lever section 4a and an extended section 4b. The lever section 4a extends linearly and is shaped into a plate form. The extended section 4b extends from a middle part of the lever section 4a in a direction perpendicular to a longitudinal direction of the lever section 4a (toward the vehicle front end side from the middle part of the lever section 4a). Similar to the lever section 4a, the extended section 4b is shaped into a plate form. Furthermore, the extended section 4b has a step 4c at its base end, so that a distal end portion of the extended section 4b is placed above the lever section 4a. One end of the third lever 4 is rotatable connected to a first connection 2a that is provided in a top surface of a distal end portion of the first lever 2. The other end of the third lever 4 is rotatably connected to a second connection 3a that is provided in a top surface of a distal end portion of the second lever 3 and is spaced away from the first connection 2a by a predetermined distance. Here, FIGS. 1 and 2 show the first to third levers 2–4 placed under a rest state (i.e., the first wiper blade 6 lies at the lower end side of the windshield and is oriented in the width direction of the vehicle, as shown in FIG. 4). In the rest state, the extended section 4b is positioned closer to the vehicle front end side (i.e., a direction of an arrow that pointing to the vehicle front end side in FIG. 2) than the lever section 4a. The third lever 4 is placed on the top surface of the distal end portion of the first lever 2 and is also placed on the top surface of the distal end portion of the second lever 3, so that the lever section 4a of the third lever 4 is positioned above the first and second levers 2, 3. In this embodiment, the first to third levers 2–4 are designed to satisfy the following conditions. That is, a length ratio among a first length Z1 between the first support shaft 7 and the first connection 2a, a second length Z2 between the first connection 2a and the second connection 3a, a third length Z3 between the second connection 3a and the second support shaft 9, and a fourth length Z4 between the second support shaft 9 and the first support shaft 7 is about 1:1.06:2.12:2.56.

An arm support shaft 10 is secured to a distal end portion of the extended section 4b and extends upwardly therefrom. In the present embodiment, the arm support shaft 10 is manufactured separately from the third lever 4. During assembly, on the top side of the expanded section 4b of the third lever 4, a base end portion of the arm support shaft 10 is inserted through a through hole that penetrates through the distal end portion of the extended section 4b. Then, a head of the inserted base end portion of the arm support shaft 10, which protrudes from the bottom side of the expanded section 4b, is clinched to non-rotatably secure the arm support shaft 10 to the distal end portion of the extended section 4b of the third lever 4. The clinched head of the base end portion of the arm support shaft 10 protrudes slightly downwardly from the distal end portion of the extended section 4b but is placed above both the top surfaces of the first and second levers 2, 3 (i.e., above a plane in which the top surfaces of the first and second levers 2, 3 are located) due to the step 4c formed at the base end portion of the extended section 4b.

The first wiper arm 5 includes an arm head 11 and a retainer 12 (FIG. 4). The arm head 11 is generally crank-shaped. A base end portion of the arm head 11 is non-rotatably screwed to an upper end portion of the arm support shaft 10. As shown in FIG. 2, a distal end side of the arm head 11 is arranged to extend along a longitudinal center axis of the lever section 4a of the third lever 4 (i.e., the line L that connects between the first connection 2a and the second connection 3a). The first wiper blade 6 (FIG. 4) for wiping the windshield 1 is connected to a distal end portion of the arm head 11 through the retainer 12.

Figure 8:
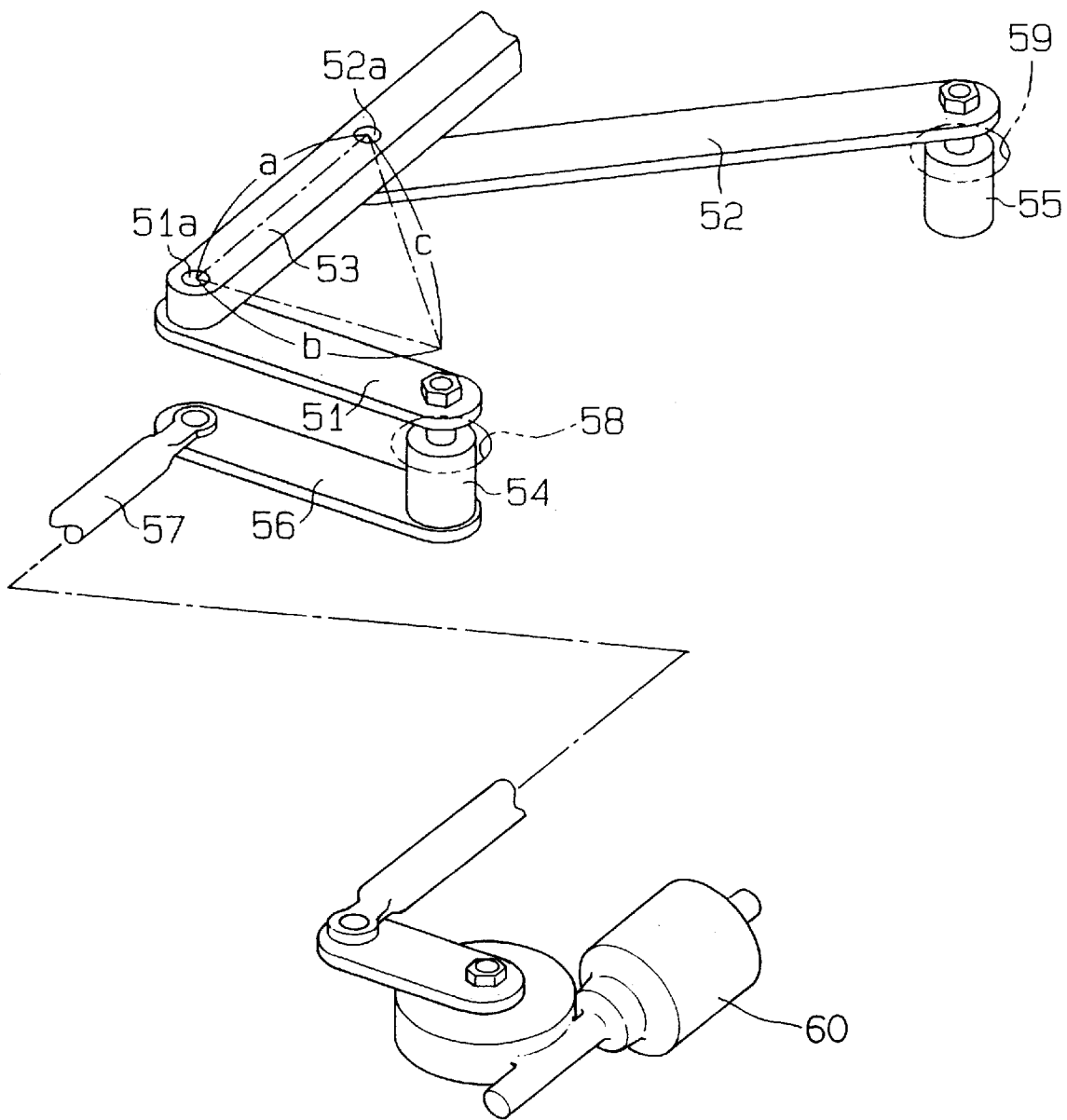
FIG. 8 is a perspective view showing a four-bar linkage mechanism of a previously proposed wiper apparatus.

On the bottom side of the first lever 2, a rod 13 is rotatably connected to the first connection 2a through, for example, a ball joint. The first lever 2 reciprocally swings about the first support shaft 7 within a predetermined angular range θ1 (FIG. 3) when it is driven by a driving force transmitted from a motor acting as a drive source (not shown) through the rod 13. The motor of the present embodiment is similar to the motor 60 of the previously proposed wiper apparatus shown in FIG. 8.

The arm support shaft 10 is positioned at a predetermined offset position that is offset from the line L that connects between the first connection 2a and the second connection 3a (as shown in the top view of FIG. 2, the above predetermined offset position is offset from the line L by an offset distance D). The predetermined offset position of the arm support shaft 10 is selected such that a moving path P (FIG. 3) of the arm support shaft 10 during the reciprocal swing motion of the first lever 2 within the predetermined angular range θ1 extends generally in the width direction of the vehicle (i.e., the moving path P has a relatively large extent in the width direction of the vehicle and a relatively small extent in a fore-aft direction of the vehicle) near the lower end side of the windshield 1. Furthermore, the predetermined offset position of the arm support shaft 10 is selected such that the moving path P (FIG. 3) of the arm support shaft 10 is located within a moving path of a tetragon that has its four corners at the first support shaft 7, the second support shaft 9, the first connection 2a and the second connection 3a, respectively.

The cowl louver 8 has an elongated through hole 14 that extends along the moving path P of the arm support shaft 10. A middle part of the arm support shaft 10 extends through the elongated through hole 14 and protrudes outwardly. That is, the first to third levers 2–4 (four-bar linkage mechanism) and the rod 13 are placed below the cowl louver 8 (inside the vehicle body).

Figure 5:
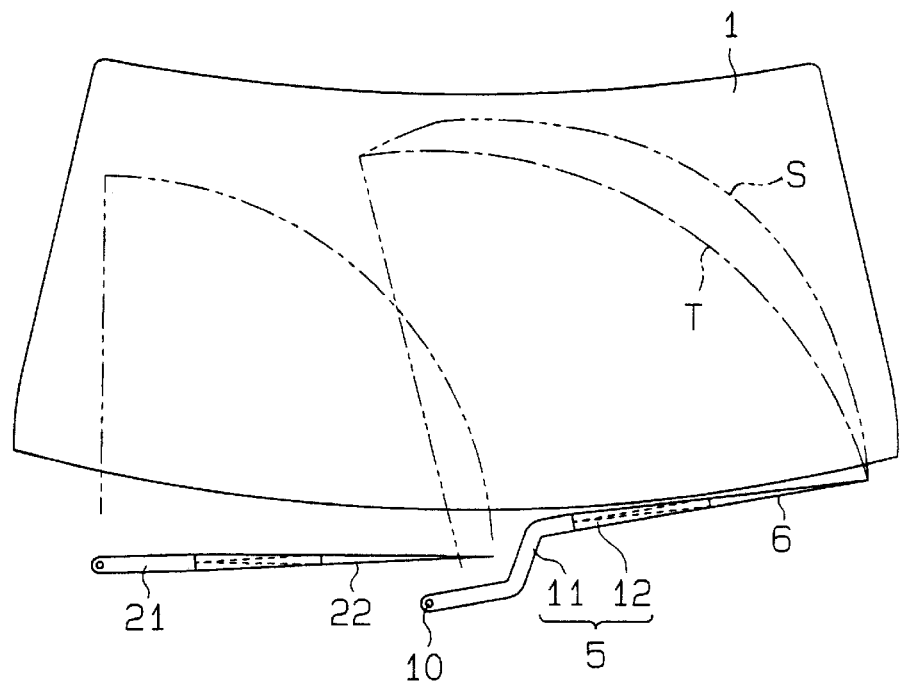
FIG. 5 is a schematic frontal view of a windshield and some components of the wiper apparatus, showing the operation of the wiper apparatus.

Apart from the above described wiper apparatus, another wiper apparatus arranged at one lateral side (left side in FIG. 4) of the windshield 1 has a second wiper arm 21 that swings about one stationary support point. A second wiper blade 22 that wipes the windshield 1 synchronously with the first wiper blade 6 is connected to the second wiper arm 21. With reference to FIGS. 4 and 5, when the second wiper blade 22 is positioned at its rest position (when the second wiper blade 22 lies along the lower end side of the windshield 1), a portion (distal end portion) of the second wiper blade 22 is placed behind and is aligned with the arm support shaft 10 in the fore-aft direction of the vehicle (placed between the arm support shaft 10 and the windshield 1).

In the above wiper apparatus having the four-bar linkage mechanism, when the motor is driven to swing the first lever 2, the second and third levers 3, 4 also swing while keeping the predetermined space between the first connection 2a and the second connection 3a. During this time, as illustrated with various positions Q1–Q9 of the third lever 4 observed during its swing motion in FIG. 3, the third lever 4 swings about its one end portion (the first connection 2a) in a direction opposite to that of the first lever 2 (i.e., when the first lever 2 swings in a clockwise direction, the third lever 4 swings in a counterclockwise direction) while the one end (the first connection 2a) of the third lever 4 reciprocates along the arcuate path that has a predetermined radius. Thus, the windshield 1 (the right side of the windshield 1 in FIG. 5) is wiped by the first wiper blade 6 that swings integrally with the third lever 4. With reference to FIG. 3, during this operation, the four-bar linkage mechanism is operated such that the second connection 3a of the third lever 4 approaches closest to the windshield 1 when the third lever 4 is located in the middle position Q5. Thus, a wiping ranges (depicted with a dot-dot-dash line in FIG. 5) of the first wiper blade 6 on the windshield 1 is increased in comparison to a wiping range T (depicted with a dot-dash line in FIG. 5) of the wiper blade that swings about the single stationary axis. Furthermore, during this operation, the arm support shaft 10 secured to the extended section 4b of the third lever 4 reciprocally moves along a moving path P shown in FIG. 3. Furthermore, the second wiper arm 21 and the second wiper blade 22 are driven synchronously with the first wiper blade 6, so that the second wiper blade 22 wipes the windshield 1 (left side in FIG. 5).

Advantages of the above embodiment will be described below.

(1) The arm support shaft 10, which is secured to the base end portion of the first wiper arm 5, is arranged to extend upwardly at the predetermined offset position that is offset from the line L that connects between the first connection 2a and the second connection 3a on the third lever 4 (as shown in the top view of FIG. 2, the predetermined offset position is offset from the line L by an offset distance D). In the present embodiment, the predetermined offset position of the arm support shaft 10 is selected such that a moving path P (FIG. 3) of the arm support shaft 10 during the reciprocal swing motion of the first lever 2 within the predetermined angular range θ1 extends generally in the width direction of the vehicle (i.e., the moving path P has the relatively large extent in the width direction of the vehicle and the relatively small extent in the fore-aft direction of the vehicle) near the lower end side of the windshield 1. The cowl louver 8 has the elongated through hole 14 that extends along the moving path P of the arm support shaft 10. The middle part of the arm support shaft 10 extends through the elongated through hole 14. That is, the first to third levers 2–4 (four-bar linkage mechanism) and the rod 13 are placed below the cowl louver 8 (inside the vehicle body). Thus, the number of the components disposed above the cowl louver 8 is reduced. This achieves an improvement in the appearance of the vehicle and allows elimination of the dedicated cover or the like for protecting the four-bar linkage mechanism from the snow, twigs and other undesirable obstacles. Furthermore, the moving path P (FIG. 3) of the arm support shaft 10 extends in the width direction of the vehicle near the lower end side of the windshield 1 (i.e., the moving path P has the relatively large extent in the width direction of the vehicle and the relatively small extent in the fore-aft direction of the vehicle), so that the elongated through hole 14, through which the arm support shaft 10 is received, also extends in the width direction (i.e., the elongated through hole 14 has a relatively large extent in the width direction of the vehicle and a relatively small extent in the fore-aft direction of the vehicle). This allows easy layout of the vehicle components. More specifically, unlike the previously proposed wiper apparatus, there is no need to provide the simple (i.e., having the predetermined radius) arcuate through hole, which has the relatively large extent in the fore-aft direction of the vehicle, in the cowl louver 8. Thus, the structure for achieving the predetermined wiping range, the size of the four-bar linkage mechanism, and the accommodating space for accommodating the four-bar linkage mechanism can be more freely designed, allowing easier layout of the components. That is, the wider wiping range, the improved vehicle appearance, the easier layout of the vehicle components and the elimination of the dedicated cover or the like for protecting the four-bar linkage mechanism from the snow, twigs and other undesirable obstacles can be achieved in the above embodiment.

(2) The predetermined offset position of the arm support shaft 10 is selected such that the moving path P (FIG. 3) of the arm support shaft 10 is located within the moving path of the tetragon that has its four corners at the first support shaft 7, the second support shaft 9, the first connection 2a and the second connection 3a, respectively. Thus, the provision of the arm support shaft 10 at the predetermined offset position (the position that is offset from the line L, which connects between the first connection 2a and the second connection 3a, by the offset distance D) does not cause an increase in an occupying space of the four-bar linkage mechanism (when viewed from the top). As a result, there are less limitations in designing the accommodating space of the four-bar linkage mechanism, allowing easier layout of the four-bar linkage mechanism.

(3) The lever section 4a of the third lever 4 is arranged above both the first and second levers 2, 3, and the distal end portion of the extended section 4b, to which the arm support shaft 10 of the third lever 4 is secured, is placed above the lever section 4a by providing the step 4c at the base end portion of the extended section 4b. Thus, after the arm support shaft 10 is secured to the extended section 4b by clinching the head of the base end portion of the arm support shaft 10 on the bottom side of the expanded section 4b of the third lever 4, the remaining clinched head of the base end portion of the arm support shaft 10, which protrudes downwardly from the extended section 4b, can be placed above both the first and second levers 2, 3.

As a result, the clinched head of the base end portion of the arm support shaft 10 does not contact the first and second levers 2, 3 when the wiper apparatus (four-bar linkage mechanism) is driven. In this way, the arm support shaft 10 can be easily secured to the extended section 4b. Also, generation of noises caused by contact between the clinched head of the base end portion of the arm support shaft 10 and the first or second lever 2, 3 can be advantageously restrained, and smooth movement of the wiper apparatus is achieved.

(4) While the first and second wiper blades 6, 22 are positioned at its rest position, the arm support shaft 10 is offset from the line L, which connect between the first connection 2a and the second connection 3a, toward the vehicle front end side, and the portion (distal end portion) of the second wiper blade 22 is placed behind of the arm support shaft 10 and is aligned with the arm support shaft 10 in the fore-aft direction of the vehicle (placed between the arm support shaft 10 and the windshield 1). Thus, the second wiper blade 22, which is capable of achieving the desired wiping range and is positioned at its rest position, can be easily hidden, for example, under (inside) a portion of a bonnet 23, which is located adjacent to the lower end of the windshield 1. Especially, in a case where a fin is provided to the second wiper blade 22 to prevent lifting of the second wiper blade 22 by wind pressure during high speed driving of the vehicle, and the fin of the second wiper blade 22 is positioned adjacent to and is aligned with the first wiper arm 5 in the fore-aft direction of the vehicle, the layout of the second wiper blade 22 and the first wiper arm 5 has limitations and is difficult because of possible interference between the fin of the second wiper blade 22 and the first wiper arm 5.

However, in the present embodiment, the arm support shaft 10, to which the first wiper arm 5 is connected, is offset from the line L by the offset distance D, so that it is possible to layout the second wiper blade 22 and the first wiper arm 5 without causing the interference between the fin of the second wiper blade 22 and the first wiper arm 5.

The above embodiment can be modified as follows.

In the above embodiment, the predetermined offset position of the arm support shaft 10 is selected such that the moving path P (FIG. 3) of the arm support shaft 10 during the reciprocal swing motion of the first lever 2 within the predetermined angular range θ1 extends generally in the width direction of the vehicle (i.e., the moving path P has the relatively large extent in the width direction of the vehicle and the relatively small extent in the fore-aft direction of the vehicle) near the lower end side of the windshield 1. However, the predetermined offset position of the arm support shaft 10 can be changed to any other suitable position to change the moving path of the arm support shaft 10.

Figure 6:
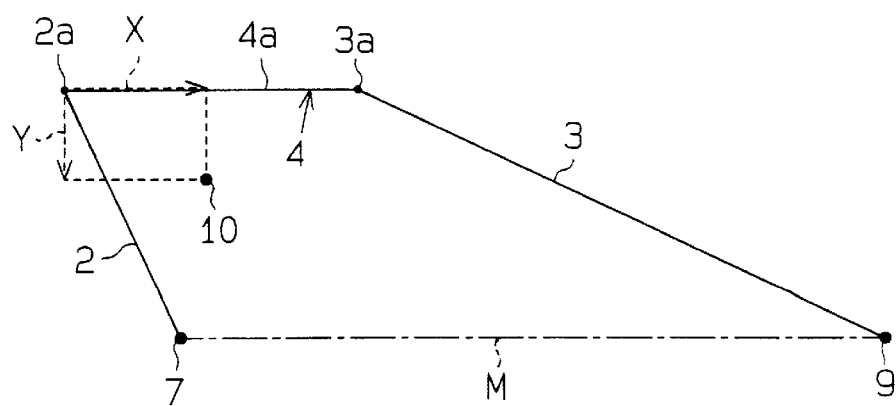
FIG. 6 is a schematic view showing one moving path of an arm support shaft of the wiper apparatus.
Figure 7:
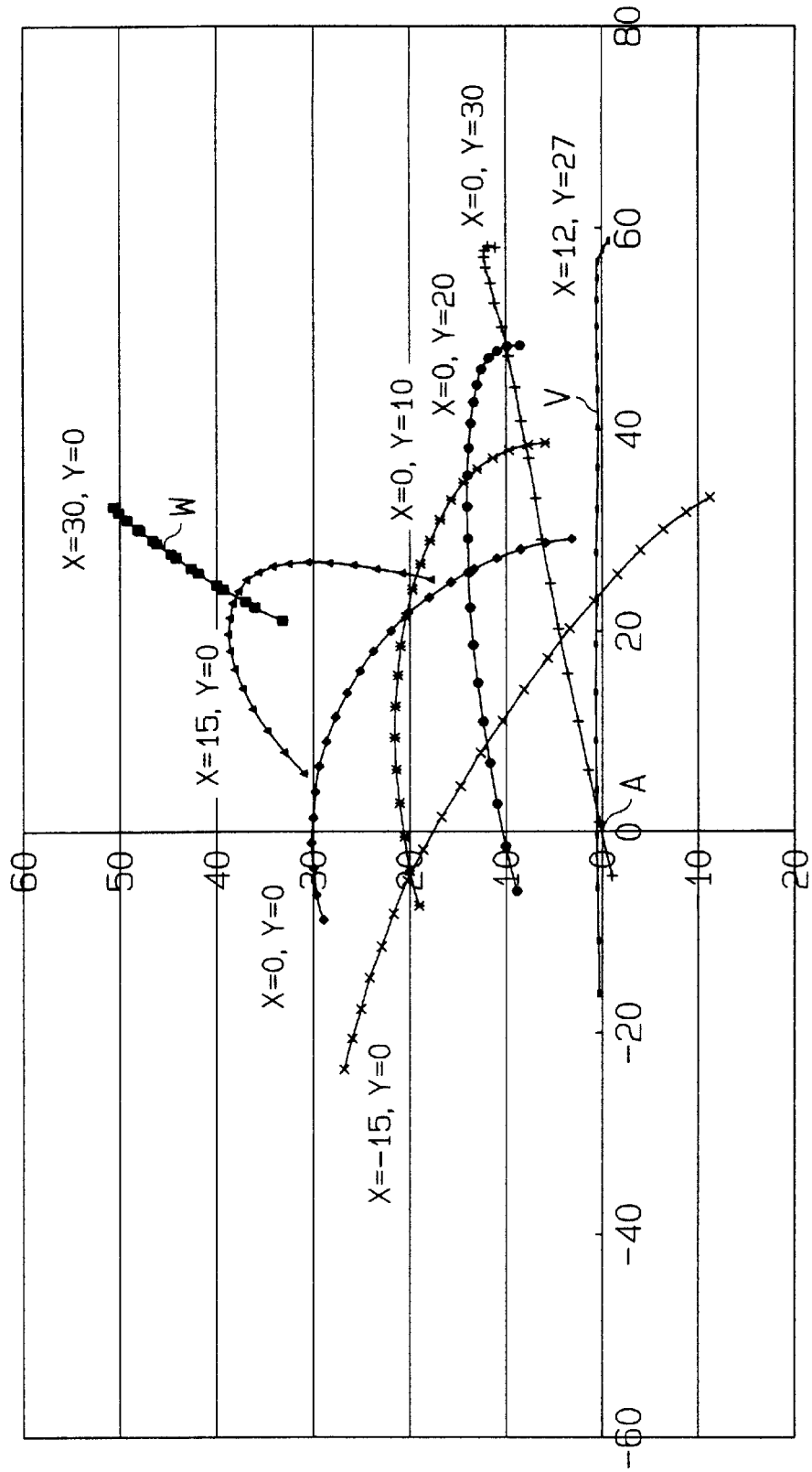
FIG. 7 is a graph showing various possible moving paths of the arm support shaft of the wiper apparatus.

FIG. 7 shows various possible moving paths of the arm support shaft 10 that are obtained by changing the offset position of the arm support shaft 10. These moving paths are obtained when the position of the arm support shaft 10 with respect to the first connection 2a is changed in X- and Y-directions in FIG. 6 while the lever section 4a of the third lever 4 is positioned to extend in parallel with a line M that connects between the first support shaft 7 and the second support shaft 9. In FIG. 7, a point A represents the position of the first support shaft 7, and the moving paths of the arm support shaft 10 are obtained when the first lever 2 reciprocally swings about the first support shaft 7 within the predetermined angular range θ1.

As shown in FIG. 7, by shifting (in the X- and Y-directions) the offset position of the arm support shaft 10 to a desired point, a corresponding desired moving path of the arm support shaft 10 can be obtained. For example, when the moving path of the arm support shaft 10 is changed to the moving path V (X=12, Y=27) shown in FIG. 7, the arm support shaft 10 moves more in the width direction of the vehicle and moves less in the fore-aft direction of the vehicle. Alternatively, when the moving path of the arm support shaft 10 is changed to the moving path W (X=30, Y=0) shown in FIG. 7, the arm support shaft 10 move less in the width direction of the vehicle and moves more in the fore-aft direction of the vehicle. By modifying the moving path of the arm support shaft 10 in the above manner, the shape of the through hole 14 can be changed to the desired shape.

In the above embodiment, the predetermined offset position of the arm support shaft 10 is selected such that the moving path P (FIG. 3) of the arm support shaft 10 during the reciprocal movement of the first lever 2 within the predetermined angular range θ1 is located within the moving path of the tetragon that has its four corners at the first support shaft 7, the second support shaft 9, the first connection 2a and the second connection 3a, respectively. However, the moving path P can be partially or entirely placed outside of the moving path of the tetragon. Even with such a modification, the advantages similar to those discussed in the sections (1), (3) and (4) can be achieved.

In the above embodiment, the lever section 4a of the third lever 4 is placed above both the first and second levers 2, 3, and the distal end portion of the extended section 4b, to which the arm support shaft 10 is secured, is placed above the lever section 4a by providing the step 4c at the base end portion of the lever section 4a. However, this structure can be modified to any other suitable structure as long as it does not cause interference during operation of the wiper apparatus (four-bar linkage mechanism).

For example, if the arm support shaft 10 can be secured to the distal end portion of the extended section 4b in a manner that allows elimination of any protrusion that extends from the bottom side of the extended section 4b, the step 4c can be eliminated. Even with such a modification, the advantages similar to those discussed in the sections (1), (2) and (4) can be achieved. Furthermore, with such a modification, generation of noises induced by the contact between the protrusion, which extends downwardly from the bottom side of the extended section 4b, and the first lever or the second lever 2, 3 can be eliminated, and smooth movement of the four-bar linkage mechanism is ensured.

By way of example, the arm support shaft 10 can be integrally formed at the distal end portion of the extended section 4b without forming the protrusion that extends downwardly from the bottom side of the extended section 4b. In this manner, the step 4c can be eliminated. Even with this modification, the advantages similar to those discussed in the sections (1), (2) and (4) can be achieved. Furthermore, with this modification, generation of noises induced by the contact between the protrusion, which extends downwardly from the bottom side of the extended section 4b, and the first lever or the second lever 2, 3 can be eliminated, and smooth movement of the four-bar linkage mechanism is ensured.

Also, by the way of example, the predetermined offset position of the arm support shaft 10 can be changed in such a way that the remaining clinched head of the base end portion of the arm support shaft 10 does not contact both the first and second levers 2, 3. Alternatively, the angular range, through which the first lever 2 reciprocally swings, can be changed in such a way that the remaining clinched head of the base end portion of the arm support shaft 10 does not contact both the first and second levers 2, 3. In this manner, the lever 4a needs not be placed above the first and second levers 2, 3, and the step 4c can be eliminated. Furthermore, the first connection 2a side of the first lever 2 can be raised relative to the first support shaft 7 side of the first lever 2, and the second connection 3a side of the second lever 3 can be raised relative to the second support shaft 9 side of the second lever 3, so that the extended section 4b is spaced from the top surfaces of the first and second levers 2, 3 to prevent contact therebetween. Even with such a modification, the advantages similar to those discussed above can be achieved.

In the above embodiment, while the wiper apparatus is at the rest position, the arm support shaft 10 is offset from the line L, which connects between the first connection 2a and the second connection 3a, toward the vehicle front end side, and the portion (distal end portion) of the second wiper blade 22 is placed behind the arm support shaft 10 and is aligned with the arm support shaft 10 in the fore-aft direction of the vehicle (placed between the arm support shaft 10 and the windshield 1).

However, the portion (distal end portion) of the second wiper blade 22 needs not be aligned with the arm support shaft 10. For example, the distal end portion of the second wiper blade 22 can be placed at the vehicle widthwise end side of the arm support shaft 10 (at the left end of the arm support shaft 10). Even with such a modification, the advantages similar to those discussed in the above sections (1)–(3) can be achieved.

In the above embodiment, the invention is embodied in the vehicle that has the cowl louver 8 at the lower end side of the windshield 1. However, the present invention can be embodied in the vehicle that does not have the cowl louver 8. For example, the present invention can be embodied in a vehicle that has a portion corresponding to the cowl louver 8 of the above embodiment but being integrated into a vehicle body segment made of a metal plate. In such a case, a through hole similar to the through hole 14 may be made in the metal plate, and the middle portion of the arm support shaft 10 may be received through the through hole made in the metal plate. Even in such a case, the number of the components disposed outside of the metal plate is relatively small, and hence the vehicle appearance is improved.

Furthermore, there is no need to provide the cover or the like to protect the four-bar linkage mechanism. Also, unlike the previously proposed wiper apparatus having the simple (i.e., having the predetermined radius) arcuate through hole, which has the relatively large extent in the fore-aft direction of the vehicle, the above through hole, which receives the arm support shaft 10, extends in the width direction (i.e., the through hole has the relatively large extent in the width direction of the vehicle and the relatively small extent in the fore-aft direction of the vehicle). Thus, there is a reduced number of limitations in designing the structure for achieving the predetermined wiping range, the size of the four-bar linkage mechanism, and the accommodating space for accommodating the four-bar linkage mechanism. Thus, the layout of the components in the vehicle becomes much easier. That is, it is possible to achieve the increase in the wiping range, the improvement in the vehicle appearance, easier layout of the components of the vehicle and the elimination of the cover or the like for protecting the four-bar linkage mechanism from the snow, twigs and other undesirable obstacles.

In the above embodiment, the wiper apparatus arranged at the one side (left side in FIG. 4) of the windshield 1 swings the second wiper arm 21 about the single stationary axis. However, this wiper apparatus can be replaced with the wiper apparatus similar to one that is arranged at the center of the windshield 1. Even with such a modification, the advantages similar to those discussed in the above embodiment can be achieved. Furthermore, with this modification, it is possible to increase the wiping range at the one side (left side in FIG. 4) of the windshield.

It is also possible to integrate the wiper apparatus arranged at the one side (left side in FIG. 4) of the windshield 1 into the wiper apparatus similar to one that is arranged at the center of the windshield 1.

In the above embodiment, the invention is embodied in the wiper apparatus of the vehicle arranged at the lower end side of the windshield 1. However, the present invention can be embodied as a wiper apparatus provided at any other wiping surface (e.g., the rear window glass).

Additional advantages and modifications will readily occur to those skilled in the art. The invention in its broader terms is therefore, not limited to the specific details, representative apparatus, and illustrative examples shown and described.

What is claimed is:

1. A wiper apparatus for wiping a wiping surface of a vehicle comprising:
    a drive source;
    a first swing element rotatably supported by a first support element that is connected to a vehicle body of said vehicle, said first swing element having a first connection spaced away from said first support element, said first swing element being reciprocally swung about said first support element by a driving force transmitted from said drive source;
    a second swing element rotatably supported by a second support element that is connected to said vehicle body and is spaced away from said first support element, said second swing element having a second connection spaced away from said second support element;
    a connecting swing element rotatably connected to said first connection of said first swing element and also rotatably connected to said second connection of said second swing element in such a manner that said first connection is spaced away from said second connection, said connecting swing element having an arm support shaft that is arranged at an offset position offset from a line connecting between said first connection and said second connection;
    a wiper arm secured to said arm support shaft of said connecting swing element to integrally move therewith; and
    a wiper blade connected to a distal end of said wiper arm to wipe said wiping surface of said vehicle.

2. A wiper apparatus according to claim 1, wherein a moving path of said arm support shaft is located within a moving path of a tetragon that has its four corners at said first support element, said second support element, said second connection and said first connection, respectively.

3. A wiper apparatus according to claim 1, wherein:
    said connecting swing element is placed on a top surface side of said first swing element and is also placed on a top surface side of said second swing element; and
    said offset position on said connecting swing element is placed above a plane in which said top surface of said first swing element and said top surface of said second swing element are located.

4. A wiper apparatus according to claim 1, wherein said connecting swing element includes an extended section that extends to said offset position and supports said arm support shaft.

5. A wiper apparatus according to claim 1, wherein said first support element, said drive source, said first swing element, said second support element, said second swing element, said first connection, said second connection and said connecting swing element are arranged inside of said vehicle body;
    said arm support shaft extends through said vehicle body and protrudes outwardly from said vehicle body; and
    said wiper arm and said wiper blade are arranged outside of said vehicle body.

6. A wiper apparatus according to claim 5, wherein said vehicle body includes a through hole that penetrates through said vehicle body, said through hole extends along a moving path of said arm support shaft.

7. A wiper apparatus according to claim 1, wherein an extent of a moving path of said arm support shaft in a width direction of said vehicle is larger than an extent of said moving path of said arm support shaft in a fore-aft direction of said vehicle.

8. A wiper apparatus according to claim 1, wherein a length ratio among a first length between said first support element and said first connection, a second length between said first connection and said second connection, a third length between said second connection and said second support element, and a fourth length between said second support element and said first support element is about 1:1.06:2.12:2.56.

9. A wiper apparatus for wiping a wiping surface of a vehicle comprising:
    a drive source;
    a first swing element rotatably supported by a first support element that is connected to a vehicle body of said vehicle, said first swing element having a first connection spaced away from said first support element, said first swing element being reciprocally swung about said first support element by a driving force transmitted from said drive source;
    a second swing element rotatably supported by a second support element that is connected to said vehicle body and is spaced away from said first support element, said second swing element having a second connection spaced away from said second support element;
    a connecting swing element rotatably connected to said first connection of said first swing element and also rotatably connected to said second connection of said second swing element in such a manner that said first connection is spaced away from said second connection, said connecting swing element having an arm support shaft that is arranged at an offset position offset in a direction away from said wiping surface of said vehicle from a line connecting between said first connection and said second connection;

a first wiper arm secured to said arm support shaft of said connecting swing element to integrally move therewith;

a first wiper blade connected to a distal end of said first wiper arm to wipe said wiping surface of said vehicle;

a second wiper arm rotatably supported at a stationary support point that is spaced away from both said first support element and said second support element, said second wiper arm swings about said stationary support point synchronously with said first wiper arm; and a second wiper blade connected to a distal end of said second wiper arm to wipe said wiping surface of said vehicle, a portion of said second wiper blade being aligned with said arm support shaft in a fore-aft direction of said vehicle between said arm support shaft and said wiping surface while said second wiper blade is positioned at its rest position.

10. A wiper apparatus according to claim 9, wherein a moving path of said arm support shaft is located within a moving path of a tetragon that has its four corners at said first support element, said second support element, said second connection and said first connection, respectively.

11. A wiper apparatus according to claim 9, wherein:

said connecting swing element is placed on a top surface side of said first swing element and is also placed on a top surface side of said second swing element; and said offset position on said connecting swing element is placed above a plane in which said top surface of said first swing element and said top surface of said second swing element are located.

12. A wiper apparatus according to claim 9, wherein said connecting swing element includes an extended section that extends to said offset position and supports said arm support shaft.

13. A wiper apparatus according to claim 9, wherein said first support element, said drive source, said first swing element, said second support element, said second swing element, said first connection, said second connection and said connecting swing element are arranged inside of said vehicle body;

said arm support shaft extends through said vehicle body and protrudes outwardly from said vehicle body; and said first wiper arm, said first wiper blade, said second wiper arm and said second wiper blade are arranged outside of said vehicle body.

14. A wiper apparatus according to claim 13, wherein said vehicle body includes a through hole that penetrates through said vehicle body, said through hole extends along a moving path of said arm support shaft.

15. A wiper apparatus according to claim 9, wherein an extent of a moving path of said arm support shaft in a width direction of said vehicle is larger than an extent of said moving path of said arm support shaft in a fore-aft direction of said vehicle.

16. A wiper apparatus according to claim 9, wherein a length ratio among a first length between said first support element and said first connection, a second length between said first connection and said second connection, a third length between said second connection and said second support element, and a fourth length between said second support element and said first support element is about 1:1.06:2.12:2.56.

* * * * *